Patented Aug. 21, 1951

2,565,229

UNITED STATES PATENT OFFICE 2,565,229

CONCRETE BURIAL VAULT AND METHOD OF MAKING SAME

Wilbert W. Haase, Forest Park, Ill., assignor to Wilbert W. Haase Co., Forest Park, Ill, a corporation of Illinois No Drawing. Application March 19, 1948, Serial No. 15,975

2 Claims. (Cl. 117—71)

This invention relates to concrete burial vaults and coating compositions therefor.

More particularly, this invention relates to concrete burial vaults and a coating composition therefor which is adapted to serve as a concrete curing composition and also to provide a base for any one of variously colored metallic paints which are employed as ornamental surface coatings upon concrete burial vaults.

The primary object of the present invention is to provide a new and improved concrete burial vault and a new and improved coating composition therefor which is adapted to serve as a concrete curing composition and also to provide a base for any one of variously colored metallic paints which are employed as ornamental surface coatings upon concrete burial vaults.

A suitable surface coating composition for use in the practice of the present invention may be prepared in accordance with the following example:

*Example No. 1*

Percent by volume

Base:
  Asphalt paint _____ 20
  Gilsonite asphalt paint _____ 20
Solvent (petroleum naphtha) _____ 40
Filler:
  Asbestos fibre _____ 10
  Sawdust _____ 10

In the practice of the present invention the asphalt and gilsonite may be mixed together and heated to a temperature of approximately 200° F. whereupon the solvent may be added thereto to provide the base of the new concrete burial vault surface coating composition. The asbestos fiber and sawdust may then be successively added to the mixture thus formed to provide the desired filler in the new concrete burial vault surface coating composition and to impart a certain roughness and ripple-like formation when an ornamental surface or metallic paint is applied thereover. The new concrete burial vault curing and surface coating composition thus prepared may then be allowed to cool to atmospheric temperature, whereupon it may be packed in steel drums or other containers for shipment and use.

The concrete burial vault curing and surface coating composition thus formed may be sprayed, or painted, or otherwise applied to the outer surface of a concrete burial vault, at atmospheric temperature, after the vault has been stripped from the forms, and when so applied serves as a concrete curing compound and also as a base for any selected one of the variously colored metallic paints which are applied to concrete burial vaults as ornamental surface coatings thereon, and allowed to stand until the volatile solvent evaporates and the new surface coating composition thus dries, whereupon an ornamental metallic paint may be sprayed, brushed or otherwise painted thereover.

When so applied the new concrete burial vault coating composition seals the moisture in the concrete burial vault and prevents too rapid drying thereof and also imparts a certain roughness or ripple-like formation to an ornamental metallic paint when the latter is applied thereover as an ornamental surface-coating composition.

It will thus be seen from the foregoing description that the present invention provides a new and improved concrete burial vault and a new and improved surface coating composition therefor, and that the invention has the desirable advantages and characteristics, and accomplishes its intended objects, including those hereinbefore pointed out and others which are inherent in the invention.

I claim:

1. As an article of manufacture a concrete burial vault comprising a partially cured concrete base having applied thereto the residue of a base coating mixture consisting of approximately 20% asphalt paint and approximately 20% gilsonite asphalt paint, approximately 40% volatile solvent and a filler consisting of approximately 10% asbestos fibre and approximately 10% sawdust by volume, the evaporation of moisture from said partially cured concrete base being retarded, and having an ornamental metallic paint coating thereon over said base coating, and the said filler imparting to the said ornamental metallic paint coating a ripple-like roughness.

2. The method of curing concrete burial vaults comprising forming a concrete burial vault from fresh concrete, stripping said vault from the forms in which it is cast, while said concrete is still moist, applying to the outer surface of the moist vault to seal the moisture in said vault a surface coating composition consisting of approximately 20% asphalt paint and approximately 20% gilsonite asphalt paint, approximately 40% volatile solvent and a filler consisting of approximately 10% asbestos fibre and approximately 10% sawdust, by volume, evaporating the volatile solvent from the surface coating composition to form a ripple-like residue which retards drying of said concrete and also affords a base for application of an ornamental metallic paint, and applying an ornamental metallic paint to said base.

WILBERT W. HAASE.

REFERENCES CITED

The following references are of record in the file of this patent:

UNITED STATES PATENTS

| Number | Name | Date |
|---|---|---|
| 884,993 | Rostock | Apr. 14, 1908 |
| 1,262,344 | Holzapfel | Apr. 9, 1918 |
| 1,883,683 | Gardner et al. | Oct. 18, 1922 |
| 1,914,912 | Dunford | June 20, 1933 |
| 1,943,085 | Muller et al. | Jan. 9, 1934 |
| 2,040,671 | Richardson | May 12, 1936 |
| 2,073,720 | Western | Mar. 16, 1937 |
| 2,214,904 | Johnson | Sept. 17, 1940 |
| 2,255,825 | Skeen | Sept. 16, 1941 |